United States Patent [19]
Roth

[11] Patent Number: 5,918,567
[45] Date of Patent: Jul. 6, 1999

[54] DISPOSABLE CRUSHABLE CAT LITTER BOX HAVING HYBRID SOLID AND BAGLIKE STRUCTURE

[76] Inventor: Gerda Roth, 41-15 45th St., Apt. 6H, Sunnyside, N.Y. 11104

[21] Appl. No.: 09/059,915

[22] Filed: Apr. 14, 1998

[51] Int. Cl.⁶ .......................... A01K 1/035; A01K 29/00
[52] U.S. Cl. ............................................. 119/170
[58] Field of Search .................... 119/165, 167, 119/168, 170

[56] References Cited

U.S. PATENT DOCUMENTS

| | | | |
|---|---|---|---|
| 3,358,647 | 12/1967 | Wilson | 119/169 |
| 4,090,470 | 5/1978 | Williams | 119/165 |
| 4,312,295 | 1/1982 | Harrington | 119/167 |
| 4,921,193 | 5/1990 | Benesch | 248/97 |
| 5,850,798 | 12/1998 | Engel | 119/170 |

*Primary Examiner*—Robert P. Swiatek
*Assistant Examiner*—Son T. Nguyen
*Attorney, Agent, or Firm*—Steven Horowitz

[57] ABSTRACT

A simple, disposable cat litter box has a flexible plastic pullstring bag and a crushable one piece skeletal frame containing four corner expanded rigid polystyrene plastic brackets and a connecting rim at its top. For average sized boxes, the thin bag can be extended approximately twelve inches above the frame and has a drawstring near its top edge for closure. The bottom of the bag receives cat litter. The bag has an additional reinforcer bag up to the frame sufficient to withstand cat scratches. When the box is in use, the bag is tightly wrapped around the skeletal frame or adhered or attached by standard means. Preferably, there is a single outer fold parallel to the perimeter of the bag in the midpoint of the portion of the bag that extends above the frame, or alternatively top of bag is left inside space of frame until consumer folds it around the frame. Accordingly, in preferred embodiment, the top edge of the bag during use is adjacent to and frangibly attached to the portion of the bag tightly wrapped around the very top of the frame. Vertical pleats at the top of bag widen the bag considerably and help extend the bag above the frame. To dispose, pull tabs located on opposite sides of frame. This separates the bag at its frangible connecting points and widens the bag. Simply pull bag up. When extended, close bag using drawstrings and crush frame as needed to reduce volume.

20 Claims, 3 Drawing Sheets

DISPOSABLE CRUSHABLE CAT LITTER BOX HAVING HYBRID SOLID AND BAGLIKE STRUCTURE

BACKGROUND OF THE INVENTION

1. Field of the Invention

The present invention relates to litter boxes for cats and more particularly it relates to a disposable, stackable, crushable litter box or container for cats.

2. Description of the Prior Art

Cat litter boxes are generally nondisposable and made out of hard material such as hard plastic or metal. The reason is that the box has to contain several pounds of litter and the box also has to accommodate the cat jumping into the box containing the litter. The cat uses the litter box and the litter box has to be emptied and the litter disposed of from time to time.

Disposable cat litter boxes have been invented to simplify the process of cat litter disposal but they do not solve all the problems and have several drawbacks. One particular problem is that soiled cat litter should not be handled repeatedly to avoid bacterial infections. A simple disposable bag would not suffice since such structure is needed to (i) contain the approximately five pounds of cat litter typically placed into a cat litter container, (ii) provide a sturdy environment for the cat to jump into and move around in while relieving itself and (iii) be able to withstand scratching by the cat's paws both for sanitary reasons and to avoid the inconvenience of litter and refuse spillage onto the living room floor. Complicated or bulky structures would surely address these requirements but would be difficult to dispose of and/or expensive over the long run. The prior art has addressed these concerns but have not disclosed anything that combines all the sturdiness yet lightweight flexibility that are both needed.

For example, U.S. Pat. No. 5,123,381 to Salmon is a disposable cat litter box made of a single sheet of corrugated cardboard unfolded and having various end and side extensions including end flaps and tabs. For disposal, the tabs are rotated within the end extensions in order to release the side and end extensions for refolding to their original positions at the top of the box.

Similarly, U.S. Pat. No. 4,763,603 to Coes discloses a disposable box-like container for cat litter having a bottom wall and four side walls and having a bag-like moisture proof structure that is exposed such as when a tear-tape is removed to provide sanitary disposal of the cat litter.

In neither of these or other patents is there provided a crushable and disposable cat litter box whose fixed structure is so minimal that the entire box is not only sanitary, convenient and simple to use but also lightweight, easy to manufacture and very cheap and can be crushed into a small space even though the box itself is sufficiently large to accommodate even large cats and five pounds of cat litter.

SUMMARY OF THE INVENTION

The present invention is a cat litter box made of a soft malleable plastic bag together with a solid but extremely lightweight skeletal frame made of expanded rigid polystyrene plastic. The skeletal frame is made of four corner brackets and a connecting rim at the top of the box to hold the box in place, all made of expanded rigid polystyrene plastic. The rim and brackets are breakable at any point for easier disposal, i.e. to reduce the volume of the refuse. A thin malleable plastic bag is tightly wrapped around the skeletal frame or attached to it by glue or other means. The bottom of the plastic bag receives cat litter. In order to withstand cat scratches in the lower portion of the bag, a reinforcement liner also made of malleable but slightly thicker plastic is provided inside the lower portion of the bag sufficient to withstand cat scratches. The plastic bag can be extended to approximately 12 inches above the frame by lifting the folded portion of the bag upward above the frame, as explained below. The bag has two handles or tabs on top at opposite sides of the frame and has a pleat that widens the bag considerably when the tabs are pulled. Since the bag has drawstrings at its top attached to the tabs, to close the mouth of the bag after pulling it upward, one pulls the drawstrings to draw the strings together to close bag One can break the frame as much as desired to compact the volume of the garbage.

OBJECTS AND ADVANTAGES

The following important objects and advantages of the present invention are:

(a) to provide a disposable cat litter box having a simple skeletal frame made of four corner expanded rigid polystyrene plastic brackets and a connecting rim at the top of the box, (b) to provide a cat litter box having a thin bag that is reinforced from at or below the frame sufficient to withstand cat scratches.

(c) to provide a cat litter box whose bag is tightly wrapped around the skeletal frame and has a single outer fold parallel to the perimeter of the bag in the midpoint of the portion of the bag that extends above the frame, (d) to provide a cat litter box where the top edge of the bag during use is adjacent to and frangibly attached to the portion of the bag tightly wrapped around (or otherwise attached or adhered to) the very top of the frame and where a vertical pleat in the bag widens the bag considerably and helps to extend the bag above the frame, (e) to provide a cat litter box that during disposal can be crushed to reduce its volume, (f) to provide a cat litter box where the bottom of the bag receives the cat litter and wherein the plastic bag can be extended to approximately 12 inches above the frame and has two tabs on top at opposite sides of the frame that can be grasped to pull the bag up, (g) to provide a simple cat litter bag that is disposable, stackable, crushable and made of lightweight expanded rigid polystyrene plastic and a malleable plastic bag, and (h) to provide a cat litter box having an alternative embodiment in which the top of the bag is left inside the space of the frame when shipped and the consumer then folds it around the frame.

DETAILED DESCRIPTION OF THE DRAWINGS

Figure 1:
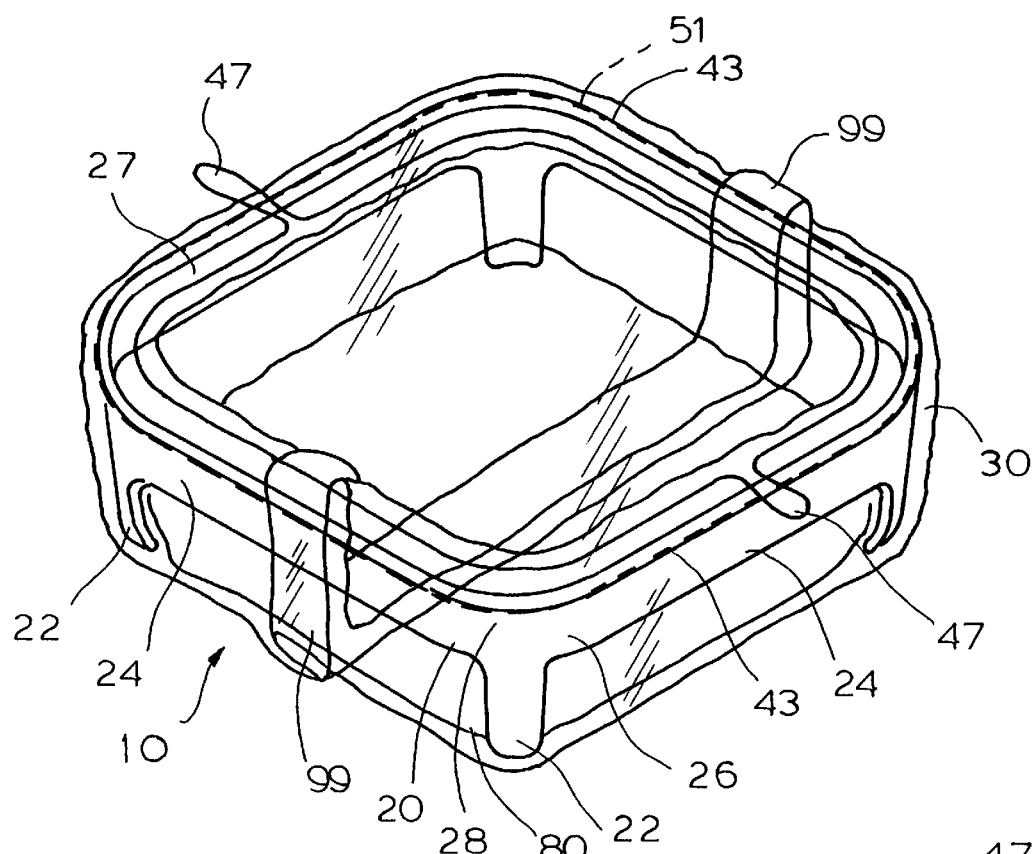
FIG. 1 depicts a perspective view of the disposable cat litter box of the present invention.

As seen in FIGS. 1–5, the disposable container or box 10 for cat litter is comprised of a skeletal frame 20 and a bag 30. The skeletal frame 20 is the minimum structure which together with the bag 30 suffices to give the container substantially box-like shape when resting on a flat surface, such as the floor. The skeletal frame 20 is comprised of only four corner brackets 22 and a connecting rim 24. The entire frame 20 is made of a lightweight expanded rigid polystyrene plastic. For stackability, the frame 20 is wider at its top 28 that at its bottom.

It is contemplated by the present invention that the number of corner brackets 22 of frame 20 need not be exactly four. Other polygonal or nonpolygonal shapes may be imagined for the container 10 using the concept of the skeletal frame 20 and connecting rim 24 so as to maintain the minimal amount of solid structure and achieve the results of the present invention. In such a case, the tabs 47 described below would be on sides of frame 20 that are opposite or approximately opposite one another.

The bag 30 is a thin flexible plastic bag 30 open at its mouth 33 and having an upper portion 40 and a lower portion 50. In folded position the upper portion 40 is held adjacent the lower portion 50, as described below. The bag 30 is tightly wrapped around the skeletal frame 20 at a top part 52 of the lower portion 50. In unfolded position the upper portion 40 extends above the frame in an amount equal to approximately twice the height of the frame. While it should be noted that the dimensions of the container 10 are merely illustrative and the present invention is not limited to containers 10 of particular dimensions, it is contemplated that for average sized cats, the height of the container 10 would be approximately six inches. It is also anticipated that although the present invention is by no means limited to boxes of a particular dimension, for the average cats the other two dimensions of the container 10 (length and width) may roughly approximate 14 inches and 17 inches. The container 10 is approximately six inches in height and is generally maintained on a floor. For kittens, box 10 will have smaller dimensions of width, length and height.

Figure 2:
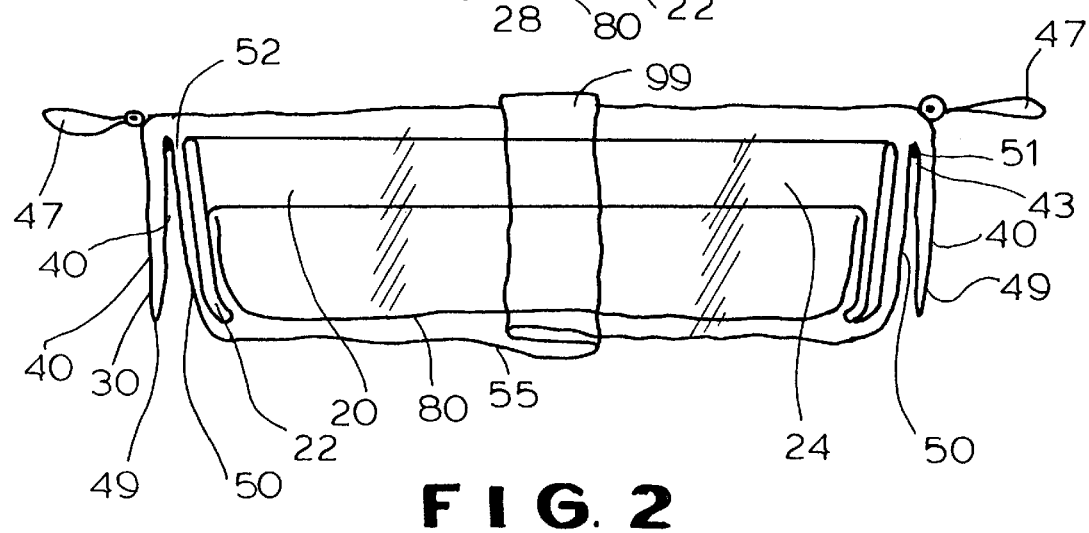
FIG. 2 depicts a side elevational view of the disposable cat litter box of the present invention.
Figure 3:
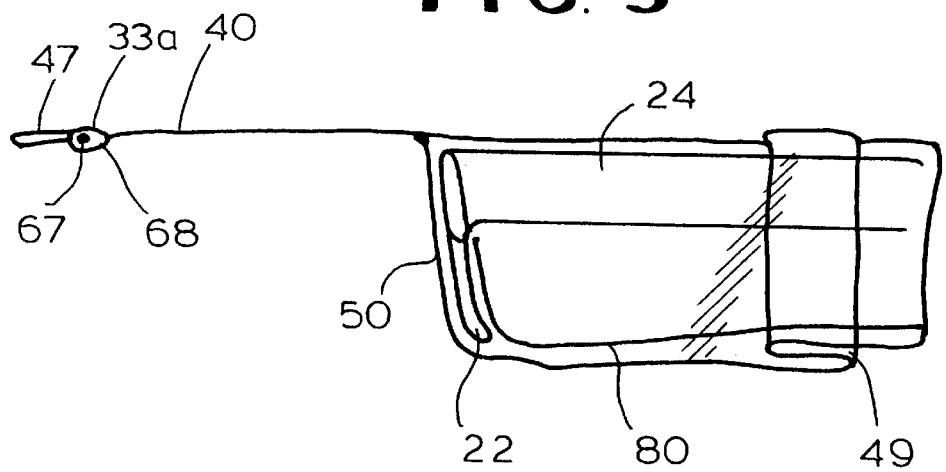
FIG. 3 depicts a fragmentary side elevational view showing the plastic bag expanded at the top.

The container 10 is in its "folded position" when in use. In folded position an upper edge 43 of the upper portion 40 of the bag 30 is frangibly connected to an upper edge 51 of the lower portion 50. The upper portion 40 of the bag 30 has at its vertical midpoint (i.e. the midpoint of the height of the upper portion 40) a single circumferential fold 49. Since the upper portion 40 the bag 30 is roughly twice the length of the lower portion 50 of the bag 30, the midpoint fold 49 assures that in folded position the upper portion 40 can be adjacent the lower portion 50, as seen in FIG. 2.

The lower portion 50 of the bag 30 includes a closed lower end 55 for the receipt of cat litter. Because of the frame 20 and the cat litter the lower portion 50 of the bag causes the container 10 to form a substantially box-like shape when resting on a flat surface. The user can also easily adjust the lower portion 50 of the bag 30 so that it substantially forms bottom corners (not shown) to maintain its substantially box-like shape.

Figure 4:
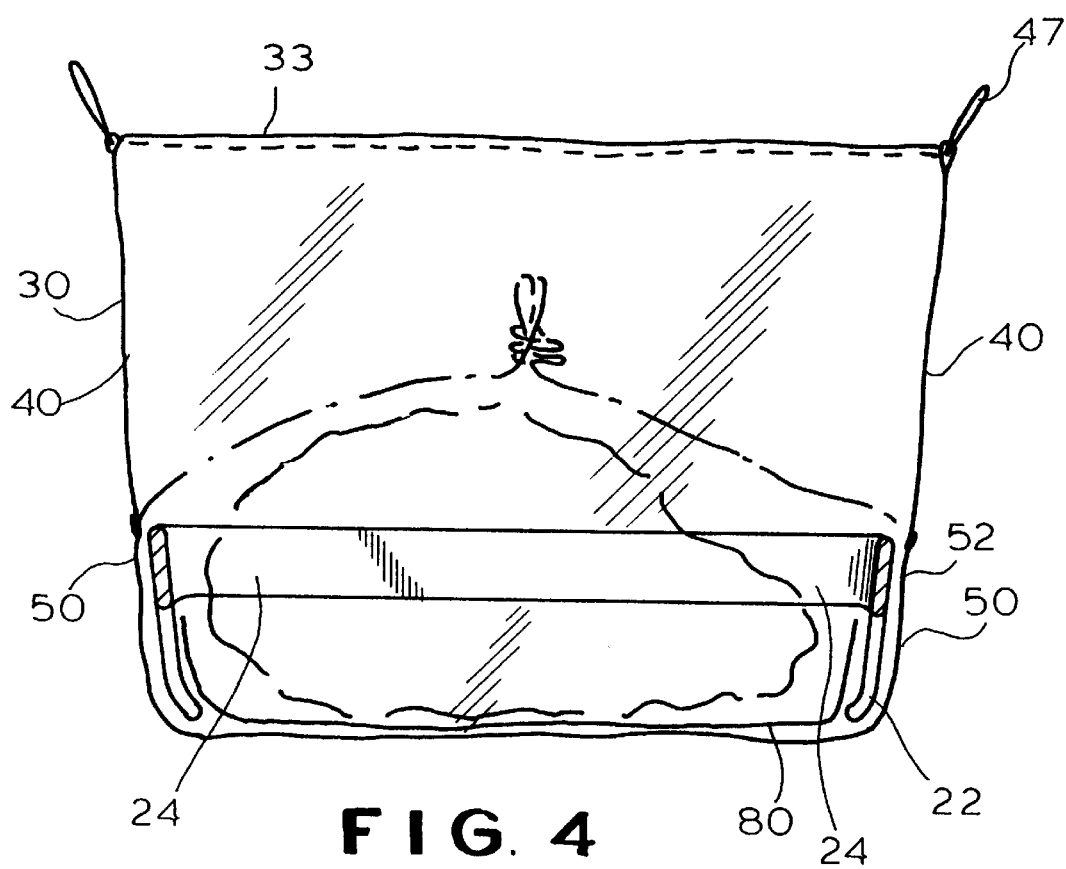
FIG. 4 depicts a side elevational view showing the plastic bag extended upward and closed.
Figure 5:
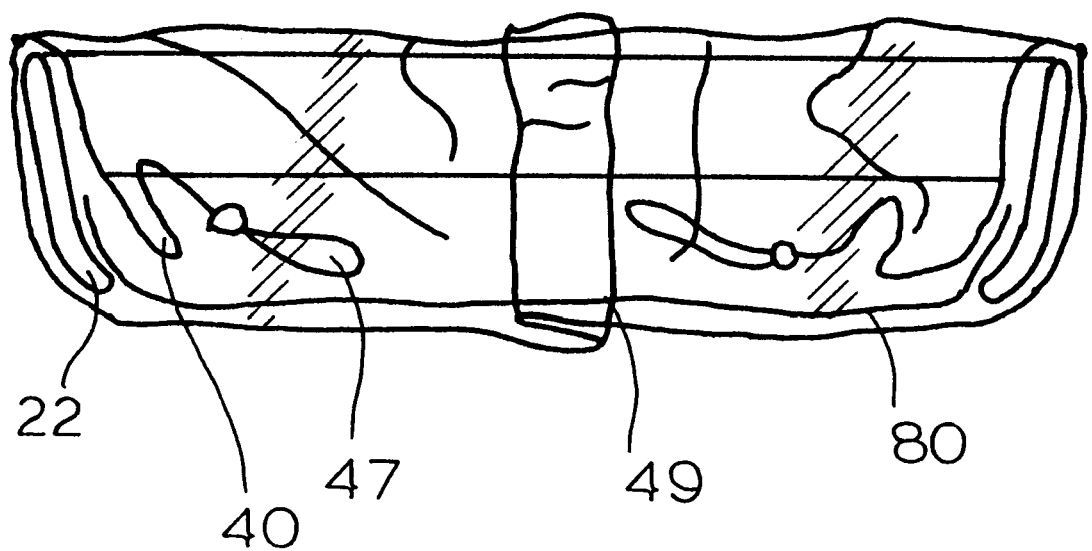
FIG. 5 depicts a side elevational view of an alternative embodiment showing the plastic bag inside the container.

The cat goes into the container 10 and uses it. When the user is ready to dispose of the container 10 all that has to be done is to extend the bag 30 upward and close it at its mouth 33. This is initiated by pulling on tabs 47 extending from the upper portion 40 of the bag 30 on opposite sides 26, 27 of the frame 20. This separates the upper portion 40 from the lower portion 50 at their frangibly connected points at the upper edge 51 of the lower portion 50 of the bag 30. Furthermore, there is a vertical pleat 99 running from a first point on a top of the mouth 33 to a second opposite point on the top of the mouth 33 for widening the bag. The pleat 99 would be more or less parallel to a portion of the rim 24 connecting to adjacent corner brackets 22, i.e. parallel to a side of frame 20. When the tabs 47 are pulled the force also widens the bag 30 due to pleat 99. By pulling upward, the user thereby unfolds the upper portion 40 of the bag 30 and extends the upper portion 40 of bag 30 above the frame 20 to its maximum height, as seen in FIG. 4, in order to facilitate closure of the bag 30.

Alternatively, instead of pleat 99, the bag 30 could have other means for widening it just above the frame 20. For example, the bag 30 could simply be manufactured so that it is wider at a point just above the lowest part of upper portion 40, i.e. just above frame 20, than the width of lower portion 50 of bag 30. This would enable the consumer to pull the bag 30 above the frame 20 without the need for pleat 99 to expand the width of bag 30.

The bag 30 also has drawstrings 67 or pullstrings 67 for easy closure running through an annular space 68 in an upper edge 33a of the mouth 33 of the bag 30. Accordingly, one can close the bag 30 by means of the drawstring 67, as seen in FIG. 4. Moreover, since the rim 24 and brackets 22 are breakable at any point, one can easily crush the entire box 10 having the cat litter in it. This makes for easier disposal.

In order to withstand cat scratches in the lower portion 50 of the bag 30, a reinforcement liner 80 also made of malleable plastic thicker than the main bag 30 is provided inside the lower portion 50 of the bag 30. The reinforcement liner 80 need only be sufficient to withstand the cat scratches and it need only extend from the very bottom of the lower portion 50 at least to the lowest part of the frame 20 and a bit higher for extra protection. The reinforcement liner 80 will ensure that the cat litter and cat urine etc. remains in the container 10 until the time of disposal.

The container 10 would be sold with the bag 30 already wrapped around the frame 20. Bag 30, in the preferred embodiment, would also come already with its upper portion 40 in folded position. In an alternative embodiment, shown in FIG. 5, that would be slightly less convenient for consumers but more convenient for manufacturers due to improved stackability (which translates into reduced extra width from the folded upper portion 40 of bag 30), the bag 30 would come having upper portion 40 laid in a folded condition in the space of the container 10. The consumer would then take the upper portion 40 out of the container 10 and fold it around frame 20 before inserting the cat litter.

It is also contemplated that the box 10 can, as one option, be manufactured and sold with the cat litter already located on closed end 55. This would be especially convenient for the consumer and would make the already convenient box 10 of the present invention even more convenient.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A disposable container for cat litter and the like, the container comprising:

a skeletal frame having four corner brackets and a connecting rim and made of a lightweight expanded rigid polystyrene plastic, a thin flexible plastic bag open at its mouth and having an upper portion and a lower portion, in folded position said upper portion held adjacent the lower portion, the bag being tightly wrapped around the skeletal frame at a top part of the lower portion of the bag, in unfolded position the upper portion of the bag extending above the frame in an amount equal to approximately twice the height of the frame, in folded position an upper edge of the upper portion of the bag being frangibly connected to an upper edge of the lower portion of the bag and the upper portion of the bag containing at its vertical midpoint a single circumferential fold, the lower portion of the bag including a closed lower end for the receipt of cat litter and forming a box-like shape when resting on a flat surface, drawstrings for closing the bag running through an annular space in an upper edge of the mouth of the bag, tabs extending from the upper portion of the bag near the drawstrings on opposite sides of the frame for separating the upper and lower portions and unfolding and extending the bag, a reinforcement liner inside the lower portion of the bag extending up to the frame, and means for widening the bag at a point just above the frame.

2. The container of claim 1, wherein the container is approximately six inches in height.

3. The container of claim 1, wherein the frame is wider at its top to provide for stackability.

4. The container of claim 1, wherein the skeletal frame can be crushed during disposal.

5. The container of claim 1, wherein a vertical pleat runs parallel to a side of the frame.

6. A disposable container for cat litter and the like, the container comprising:

a skeletal frame having four corner brackets and a connecting rim and made of a lightweight expanded rigid polystyrene plastic, a thin flexible plastic bag open at its mouth and having an upper portion and a lower portion, in folded position said upper portion held adjacent the lower portion, the bag being tightly wrapped around the skeletal frame at a top part of the lower portion of the bag, in unfolded position the upper portion of the bag extending above the frame in an amount equal to approximately twice the height of the frame, in folded position an upper edge of the upper portion of the bag being frangibly connected to an upper edge of the lower portion of the bag and the upper portion of the bag containing at its vertical midpoint a single circumferential fold, the lower portion of the bar including a closed lower end for the receipt of cat litter and forming a box-like shape when resting on a flat surface, drawstrings for closing the bag running through an annular space in an upper edge of the mouth of the bag, tabs extending from the upper portion near the drawstrings on opposite sides of the frame for separating the upper and lower portions and unfolding and extending the bag, a reinforcement liner inside the lower portion of the bag extending up to the frame, and a vertical pleat running from a first point on a top of the mouth of the bag to a second opposite point on the top of the mouth of the bag for widening the bag.

7. The container of claim 6, wherein the container is approximately six inches in height.

8. The container of claim 6, wherein the frame is wider at its top to provide for stackability.

9. The container of claim 6, wherein the skeletal frame can be crushed during disposal.

10. The container of claim 6, wherein the vertical pleat runs parallel to a side of the frame.

11. A disposable container for cat litter and the like, the container comprising:

a skeletal frame having at least four corner brackets and a connecting rim and made of a lightweight expanded rigid polystyrene plastic, a thin flexible plastic bag open at its mouth and having an upper portion and a lower portion, in folded position said upper portion held adjacent the lower portion, the bag being tightly wrapped around the skeletal frame at a top part of the lower portion, in unfolded position the upper portion extending above the frame in an amount equal to approximately twice the height of the frame, in folded position an upper edge of the upper portion of the bag being frangibly connected to an upper edge of the lower portion of the bag and the upper portion of the bag containing at its midpoint a single circumferential fold, the lower portion of the bag including a closed lower end for the receipt of cat litter and forming a box-like shape when resting on a flat surface, tabs extending from the upper portion on opposite sides of the frame for separating the upper and lower portions and unfolding and extending the bag drawstrings for closing the bag running through an annular space in an upper edge of the mouth of the bag a reinforcement bag inside the lower portion of the bag up to the frame a vertical pleat running from a first point on a top of the mouth of the bag to a second opposite point on the top of the mouth of the bag for widening the bag.

12. The container of claim 11, wherein the container is approximately six inches in height.

13. The container of claim 11, wherein the frame is wider at its top to provide for stackability.

14. The container of claim 11, wherein the skeletal frame can be crushed during disposal.

15. The container of claim 11, wherein the vertical pleat runs parallel to a side of the frame.

16. A disposable container for cat litter and the like, the container comprising:

a skeletal frame having four corner brackets and a connecting rim and made of a lightweight expanded rigid polystyrene plastic, a thin flexible plastic bag open at its mouth and having an upper portion and a lower portion, said upper portion being laid in a space in the container in an initial position, in folded position said upper portion held adjacent the lower portion, the bag being tightly wrapped around the skeletal frame at a top part of the lower portion of the bag, in unfolded position the upper portion extending above the frame in an amount equal to approximately twice the height of the frame, in folded position an upper edge of the upper portion of the bag being frangibly connected to an upper edge of the lower portion of the bag and the upper portion of the bag containing at its vertical midpoint a single circumferential fold, the lower portion of the bag including a closed lower end for the receipt of cat litter and forming a box-like shape when resting on a flat surface, drawstrings for closing the bag running through an annular space in an upper edge of the mouth of the bag, tabs extending from the upper portion near the drawstrings on opposite sides of the frame for separating the upper and lower portions and unfolding and extending the bag, a reinforcement liner inside the lower portion of the bag extending up to the frame, and means for widening the bag at a point just above the frame.

17. The container of claim 16, wherein the container is approximately six inches in height.

18. The container of claim 16, wherein the frame is wider at its top to provide for stackability.

19. The container of claim 16, wherein the skeletal frame can be crushed during disposal.

20. The container of claim 16, wherein a vertical pleat runs parallel to a side of the frame.

* * * * *